United States Patent [19]

Murano et al.

[11] 4,110,806

[45] Aug. 29, 1978

[54] CIRCUIT INTERRUPTING APPARATUS FOR USE IN DIRECT CURRENT CIRCUITS

[75] Inventors: Minoru Murano, Tokyo; Satoru Yanabu; Tohoru Tamagawa, both of Yokohama; Hisatoshi Ikeda, Zushi, all of Japan

[73] Assignee: Tokyo Shibaura Denki Kabushiki Kaisha, Japan

[21] Appl. No.: 756,345

[22] Filed: Jan. 3, 1977

[30] Foreign Application Priority Data

| | | | |
|---|---|---|---|
| Jan. 8, 1976 | [JP] | Japan | 51-1127 |
| Jan. 20, 1976 | [JP] | Japan | 51-4635 |
| Jan. 20, 1976 | [JP] | Japan | 51-4637 |

[51] Int. Cl.$^2$ .......... H02H 7/22

[52] U.S. Cl. .......... 361/4; 307/135; 323/89 C; 323/89 P; 336/155; 336/230; 361/11

[58] Field of Search .......... 361/4, 11, 10, 3, 5, 361/6; 307/131, 134, 135; 336/155, 165, 172, 230; 323/89 R, 89 C, 89 P, 89 AG; 363/69, 70

[56] References Cited

U.S. PATENT DOCUMENTS

| | | | |
|---|---|---|---|
| 3,390,305 | 6/1968 | Greenwood | 361/4 |
| 3,467,851 | 9/1969 | Dortort | 363/70 |

FOREIGN PATENT DOCUMENTS

| | | | |
|---|---|---|---|
| 433,556 | 6/1974 | U.S.S.R. | 361/11 |

*Primary Examiner*—Patrick R. Salce
*Attorney, Agent, or Firm*—Stevens, Davis, Miller & Mosher

[57] ABSTRACT

Circuit interrupting apparatus for interrupting large direct currents comprising a plurality of parallelly connected branch circuits each including a circuit breaker and a saturable reactor connected in series therewith, and a commutating circuit including a capacitor. When opening the circuit breakers the commutating circuit is connected across the branch circuits to pass commutating current in the direction opposite to the normal load current. When the current decreases below a predetermined value, the saturable reactors desaturate to efficiently interrupt the load current.

5 Claims, 6 Drawing Figures

CIRCUIT INTERRUPTING APPARATUS FOR USE IN DIRECT CURRENT CIRCUITS

BACKGROUND OF THE INVENTION

This invention relates to direct current (D.C) interrupting apparatus.

Different from alternating current (A.C), since direct current (D.C) has no natural zero point, interruption of large DC currents is difficult. According to one prior art method a commutating circuit including a capacitor is connected in parallel with an interrupter so as to pass commutation current through the contacts of the interrupter in a direction opposite to the load current, that is the current to be interrupted, at the time of circuit interruption, thereby forcibly forming a zero point. Accordingly, it is possible to use circuit breakers designed to interrupt alternating current to interrupt direct current.

However, the operating duty of the DC interrupter is different from that of the AC interrupter in that (1) in the AC interrupter the current value varies after separation of the contacts, whereas in the DC interrupter, a large DC flows until commutating current flows and (2) in the AC interrupter, the rate of current change near the zero point is determined by $\omega I_o$ (where $\omega$ represents angular velocity and $I_o$ current) whereas in the case of the DC interrupter it is determined by the commutating current. The interrupting capacity of the AC interrupter is determined by such factors as the peak value and the energy of the current, and the rate of current change near the zero point. As has been pointed out hereinabove since the rate of current change of a DC interrupter is determined by the commutating current, in order to make equal the rate of current change of the DC interrupter to that of the AC interrupter operating at 50 Hz it is necessary to increase the capacity of the commutating circuit. For this reason, it should be noted that the rate of current change is greater in the DC interrupter than in the AC interrupter. Further, the injection energy from the commutating circuit is larger in the case of the DC interrupter. Accordingly, the contacts of the DC interrupter are subjected to more severe conditions than those of the AC interrupter.

Vacuum switches are now believed to be most suitable as DC interrupters because of their high rate of current change near the zero point. Yet, it is necessary to increase their current capacity. To increase the current capacity it is necessary to improve the vacuum tank and the method of parallel operation of a plurality of vacuum interrupters. Parallel operation is advantageous because it is possible to increase the overall interrupting capacity by increasing the number of vacuum interrupters of standard design.

Parallel operation requires current balance between branches. Since the vacuum interrupter has a positive voltage-current characteristic (that is the arc voltage increases with the current) it is considered that it is suitable for parallel operation. However, due to the unbalance in the arc voltages and the difference in the contact separation initiation points it has been necessary to connect current balancing reactors in series with respective vacuum interrupters. In a DC circuit, formation of the current zero point is difficult in a branch carrying a larger current and the rate of current change becomes severe in a branch carrying smaller current thereby resulting in a failure of satisfactory current interruption. Once, the current interruption fails, a large fault would result because the commutation circuit is no longer effective.

Large inductors are generally used as the balancing reactors. However, use of large inductors increases the capacity of the commutating circuit. Accordingly, it is necessary to interlink the inductors in respective branches so as to make the overall inductance equal to zero but cause the inductors to balance the currents flowing through the branches. This arrangement, however, can not improve the interrupting characteristic of the circuit interruptors.

SUMMARY OF THE INVENTION

Accordingly, it is an object of this invention to provide improved DC interrupting apparatus of the type utilizing a plurality of parallel connected circuit interrupters in which the currents flowing through respective branches are balanced and the interrupting characteristic can be improved.

Another object of this invention is to provide improved current interrupting apparatus especially suitable for interrupting large direct currents and utilizing improved saturable reactors which not only improve the current interrupting characteristics of the apparatus but also act as current balancing reactors among a plurality of parallel branch circuits.

According to one aspect of this invention there is provided circuit interrupting apparatus for use in a direct current circuit comprising a plurality of parallelly connected branch circuits, each of the branch circuits including a circuit interrupter and a saturable reactor having a coil connected in series with the circuit interrupter and a magnetic core which saturates at a predetermined value of the current flowing through the coil, and a commutating circuit including a capacitor and a switch, and connected in parallel with the branch circuits, the switch being closed when the circuit breakers are opened to pass commutating current through the branch circuits from the capacitor.

According to another aspect of this invention there is provided circuit interrupting apparatus for use in a direct current circuit comprising a plurality of branch circuits, each including a circuit breaker and a reactor coil connected in series with the circuit interrupter, means for magnetically coupling together the reactor coils of respective branch circuits such that the magnetic fluxes produced by the reactor coils cancel each other, a saturable reactor connected in series with the parallelly connected branch circuits, and a commutating circuit including a commutating capacitor and a switch for passing a commutating current from the commutating capacitor through the saturable reactor and through respective branch circuits when the circuit breakers are opened.

DESCRIPTION OF THE PREFERRED EMBODIMENTS

Figure 1:
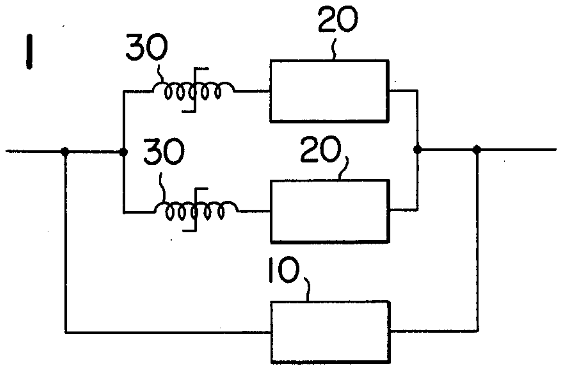
FIG. 1 is a connection diagram showing one embodiment of this invention.

As shown in FIG. 1, the circuit interrupting apparatus comprises a plurality of parallelly connected branch circuits each including a vacuum interrupter 20 and a saturable reactor 30 connected in series therewith. The number of branch circuits may be increased according to the overall interrupting capacity. A commutating circuit 10 including a capacitor as will be described later is connected in parallel with the branch circuits.

Figure 2:
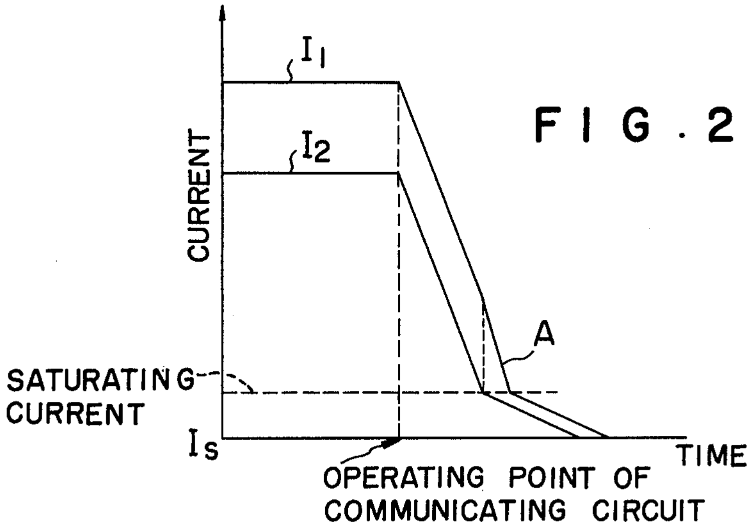
FIG. 2 shows current characteristics of one branch circuit shown in FIG. 1.

The principle of operation of this invention is as follows. The arc voltage of a vacuum interrupter after separation of the contacts usually amounts to about 10 to 100 V so that when the commutating circuit 10 operates, commutating current flows having a value which makes equal the voltage of the commutating circuit 10 and the voltage drop across the saturable reactor 30. In other words, the current decreases such that the product of the inductance L of the saturable reactor 30 and the rate of change of the current *i*, $(di/dt)$, that is $L\, di/dt$ will be equal to the voltage of the commutating circuit 10. The value of the inductance of the saturable reactor 30 is different below and above the saturating current $I_s$. That is when $i \leqq I_s$ the reactor does not saturate and has an inductance of $L_N$, whereas when $i > I_s$ the reactor saturates and has an inductance of $L_s$. Of course $L_N > L_s$. When the currents flowing through respective branch circuits are not equal, the currents flowing through the respective branch circuits will vary as shown in FIG. 2. Suppose now that the currents $I_1$ flowing through the first branch circuit is larger than the current $I_2$ flowing through the second branch circuit, then the current $I_2$ will first decrease to the saturation current $I_s$. Then, saturable reactor 30 in the second branch circuit becomes desaturated thereby increasing its inductance to $L_s$ with the result that the rate of current variation decreases. On the other hand, the saturable reactor 30 in the first branch circuit is still in the saturated condition so that the rate of change of current $I_1$ becomes larger in order to maintain the voltage drop across the first branch circuit equal to that across the second branch circuit. Such automatic current balancing action continues until current $I_1$ reaches the saturation current $I_s$. With the construction shown in FIG. 1 it is possible to balance the currents flowing through respective branch circuits at the time of passing the reverse current from the commutating circuit 10. As above described, according to this invention the current division among a number of branch circuits can be automatically adjusted. More particularly, the saturable reactor of a branch circuit carrying a smaller current reaches saturation at an earlier time. As a result, the inductance of the saturable reactor of that branch circuit increases abruptly thereby decreasing the rate of current change. On the other hand, the rate of current change of the other branch circuit increases as shown by a section A whereby the current division can be automatically adjusted. Accordingly, there is no fear of forming a current zero point only in a branch circuit carrying smaller current or making the rate of current change too large near the current zero point of that branch circuit, thereby preventing failure of current interruption.

The interrupting characteristic of the circuit interrupting apparatus shown in FIG. 1 is influenced by the rate of current change near the current zero point. Accordingly, the frequency of the reverse current supplied from the commutating circuit 10 should be low as far as possible. However, as the frequency of the reverse current is determined by the capacitance of the commutating capacitor 3 (see FIG. 3), and the inductance 4 of the commutating circuit including stray inductance and the inductance of the saturable reactor 30 it is necessary to increase the values of these elements in order to decrease the frequency. However, such a measure is expensive and not practical. Accordingly, as above described it is advantageous to utilize the characteristics of the saturable reactor described above so as to decrease the current at a high frequency by utilizing a small inductance until desaturation, and to decrease the current at a low frequency, that is slowly, beneath saturation current.

Where saturable reactors are included in respective branch circuits current balancing can be attained during the commutation period as above described. However, during normal operation, since the reactors are saturated no current balance can be expected unless the reactors are magnetically coupled together. However, when coupled together, the advantage of using the saturable reactor in DC circuit interrupting apparatus together with a commutating circuit can not be realized.

Figure 3:
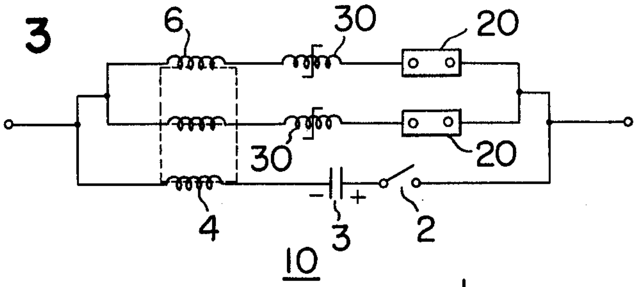
FIGS. 3 and 4 are connection diagrams showing modified embodiments of this invention and FIGS. 5 and 6 show modified saturable reactors also having a current balancing action.

FIG. 3 shows a modified embodiment of this invention which can solve this problem. In this modification, two coils of an inductor 6 are connected in series with respective branch circuits and magnetically coupled together as shown by dotted lines such that the magnetic fluxes produced by them cancel each other. The commutating capacitor is precharged by suitable charging means, not shown, to a suitable voltage and at the time of interrupting the circuit interrupters 20, a switch 2 is closed.

When the currents flowing through respective branch circuits is unbalanced by some cause a voltage drop V expressed by the following equation appears across the inductor 6.

$$V = L\, dI_1/dt + M\, dI_2/dt$$

where $I_1$ and $I_2$ represent the currents of the respective branch circuits, $L$ the self inductance of reactor 6 and $M$ the mutual inductance thereof. Since the two coils are magnetically coupled together, $M = L$, so that under a balanced condition, $V = 0$. However, in the case of an unbalance the voltage drop $V$ becomes large thus preventing a current variation. Usually, the apparent inductance is zero so that the frequency of the commutating current is determined by the values of the commutating capacitor 3, commutating inductance 4 and the saturable reactor 30.

Figure 4:
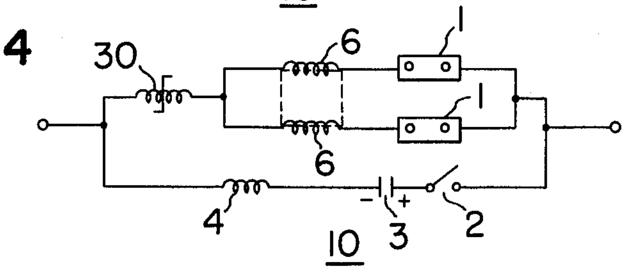

In another modification shown in FIG. 4 a single saturable reactor 30 is used in common for both branch circuits. In this case, the effect of the saturable reactor upon the current distribution among the branch circuits can be reduced and the mutual inductance of the reactor 6 can be made substantially equal to the inductance of the saturable reactor 30 when it is desaturated.

With this modification it is possible to well balance the currents flowing through the branch circuits by the action of the reactor and to control the frequency of the commutating current by the saturable reactor thereby enabling the increase of the capacity of the circuit interrupting apparatus for use in DC circuits, such as DC power transmission systems, for example.

Figure 5:
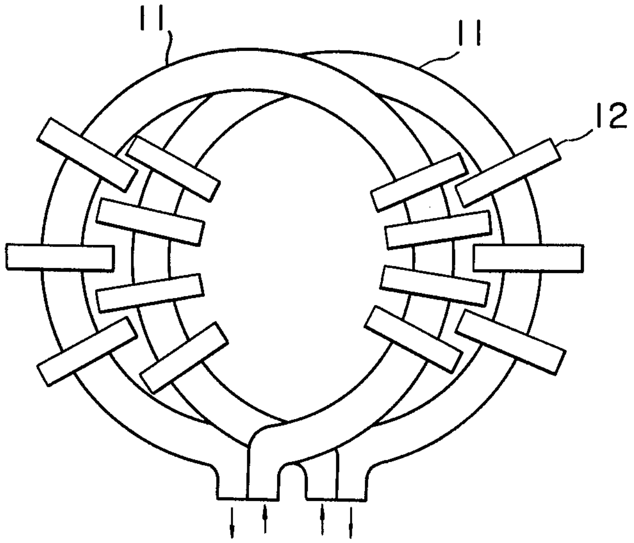

FIG. 5 shows an improved construction of the saturable reactor 30 utilized in the embodiment shown in FIG.

1 and comprising a pair of juxtaposed single or multi-turn coils 11 each linked with a plurality of saturable cores 12. Where the current flowing through each branch circuit is large the cores may be provided with air gaps. As shown, the cores of different coils are interleaved so as to facilitate flux linkage. The coils 11 are disposed such that when the cores 12 are not saturated the mutual inductance is substantially zero whereas when the cores are saturated the magnetic fluxes produced by respective coils cancel each other. Accordingly, even when the coils 11 have substantially large self-inductances, it is possible to reduce the overall inductance and to balance the currents flowing through respective branch circuits. In other words, the saturable reactor of this invention also acts as the balancing reactor 6 shown in FIGS. 3 and 4. As the cores 12 are linked with independents coils, when the cores are not saturated the mutual inductance of the coils is negligibly small. Further, since the self-inductances of the coils are large, the inductance at the time of desaturation of the cores is also large therby improving the characteristics of the saturable reactor at the time of current interruption.

Figure 6:
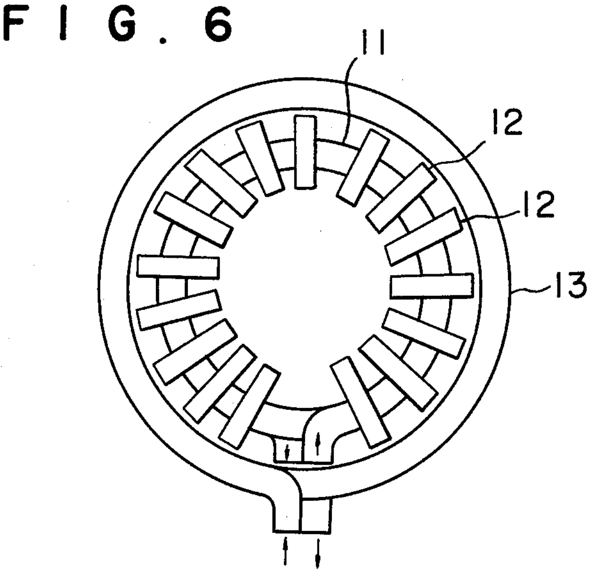

FIG. 6 shows a saturable reactor suitable for use in the embodiment shown in FIG. 3. In this case, the saturable reactor comprises a single or multi-turn coil 11 linked with a plurality of saturable magnetic cores 12 and an air core coil 13 encircling the assembly so that the magnetic fluxes produced by coils 11 and 13 cancel each other when the cores 12 saturate. Coils 11 and 13 are connected in series in each branch circuit to constitute the saturable reactor 30 and reactor 6 respectively shown in FIG. 3. Accordingly, with the modified saturable reactors shown in FIGS. 5 and 6 it is possible to eliminate the reactor 6 shown in FIG. 3.

We claim:

1. In current interrupting apparatus for use in a direct current circuit comprising parallelly connected branch circuits, each of said branch circuits including a circuit interrupter and a saturable reactor having a coil connected in series with said circuit interrupter and a magnetic core which saturates at a predetermined value of the current flowing through said coil; and, a commutating circuit including a capacitor and a switch connected in parallel with said branch circuits, the improvement wherein said saturable reactor comprises a first annular coil provided with a plurality of saturable magnetic cores, and a second annular coil encircling said first annular coil and said saturable magnetic cores, said first and second annular coils being connected in series, said switch being closed when said circuit interrupters are opened to pass commutating current through said branch circuits from said capacitor.

2. The circuit interrupting apparatus according to claim 1 wherein said commutating circuit further comprises a commutating inductor magnetically coupled to the coil of said saturable reactor.

3. The circuit interrupting apparatus according to claim 1 wherein said circuit interrupter comprises a vacuum circuit interrupter.

4. The circuit interrupting apparatus according to claim 1 which further comprises a reactor including a pair of coils connected in series with the circuit interrupters in each of said respective branch circuits and magnetically coupled with each other so that the magnetic fluxes produced by respective coils cancel each other.

5. The circuit interrupting apparatus according to claim 4 wherein the magnetic cores of adjacent coils are interleaved.

* * * * *